Patented Apr. 19, 1927.

1,625,531

UNITED STATES PATENT OFFICE.

HERMANN FRITZSCHE, EDUARD KRUMMENACHER, HANS GUBLER, AND OTTO KAISER, OF BASEL, SWITZERLAND, ASSIGNORS TO SOCIETY OF CHEMICAL INDUSTRY IN BASLE, OF BASEL, SWITZERLAND.

INTERMEDIATE PRODUCT FOR THE SYNTHESIS OF AZO DYES AND PROCESS OF MAKING SAME.

No Drawing. Application filed July 20, 1923, Serial No. 652,857, and in Switzerland September 7, 1922.

It has been found that new intermediate products for the synthesis of azo-dyes may be obtained by condensing, in a first phase, one molecular proportion of a cyanuric trihalide with one molecular proportion of a compound of the aromatic series having, firstly, a non-tertiary amino group, secondly, containing one of a group of auxochromes including

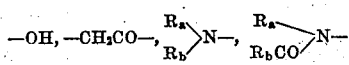

(wherein $R_a$ and $R_b$ represent the same or different alkyl, aryl or aralkyl radicals or a hydrogen atom) and, thirdly, containing still at least one strong acid group, then condensing, in a second phase, at least one molecular proportion of one of a group of compounds which contains an amino or a hydroxy group.

As compounds which may be employed in the first phase there come particularly into consideration the carboxylic and sulfonic acids of the amino-naphthols, furthermore the sulfonic and carboxylic acids of the diamines of the benzene and naphthalene series, their monoacidyl, monoalkyl, monoaralkyl and monoaryl derivatives and their asymmetric dialkyl or diaralkyl derivatives, respectively, the derivatives of the 1-aryl-5-pyrazolone sulfonic and carboxylic acids which carry amino groups in the aryl nucleus.

As compounds used in the second phase there may be employed not only the compounds of the first phase, but also the unsulfonated and uncarboxylated derivatives of same, furthermore primary and secondary amines, such as aniline, toluidine, naphthylamine, the sulfonic and carboxylic acids of same, diamines, such as phenylenediamines and toluylenediamines, nitroanilines, phenols, aminophenols, nitrophenols, furthermore aliphatic amines, as for instance diethylamines or aliphatic alcohols, and finally ammonia and water.

These condensations may in most cases be carried out by successively stirring the components together in a suitable diluent, and it was surprising to find that as such a medium water is very appropriate. The course of the reaction may be followed by the quantity of hydrogen halide obtained, or by the formation of a precipitate or a clear solution, or by the disappearance of the components.

There are thus obtained compounds of the general formula:

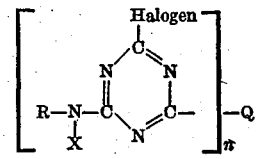

wherein R stands for an aromatic complex which contains one of a group of auxochromes including

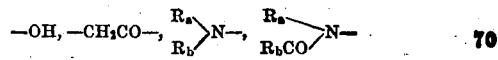

($R_a$ and $R_b$ representing the same or different alkyl, aryl or aralkyl radicals or a hydrogen atom), $x$ for a hydrogen atom or an alkyl, aralkyl or aryl residue, one of the two residues $x$ and R containing at least one strong acid group, Q for a hydrogen atom or a radical which are linked to the carbon atom of the cyanuric nucleus by one of a group of connecting links which contains O or N, and $n$ for a whole number not higher than the number of the mobile hydrogen atoms originally present in the molecule of the compound corresponding to the radical Q.

These new products are colorless to grey and yellowish powders which dissolve in solvents forming colorless to yellow and brownish solutions. They are characterized by the presence of still one mobile atom of halogen at the cyanuric nucleus.

The following examples illustrate the present invention, without, however, limiting the same.

*Example 1.*

18.5 parts of cyanuric chloride in a fine state of sub-division, a solution of 23 parts of 1-amino-4-acetylamino-3-benzene sulfonic acid in 200 parts of water, and 13.3 parts of caustic soda solution of 30 per cent strength are added to 300 parts of water. After a short time a clear solution is formed which contains the primary condensation product from 1 molecular proportion of cyanuric chloride and one molecular proportion of 1-amino-4-acetylamino-3-benzene sulfonic acid. This solution is exactly neutralized in the cold with dilute caustic soda solution, treated once more with 13.3 parts of caustic soda solution of 30 per cent strength, and stirred until the liquid is again neutral. The secondary condensation product from one molecular proportion of cyanuric chloride, one molecular proportion of 1-amino-4-acetylamino-3-benzene sulfonic acid, and one molecular proportion of water is thus formed.

This product may be precipitated in the form of a light colored precipitate by means of common salt and acid. It contains still one atom of chlorine and one acetylamino group.

By treatment of the primary condensation product in the cold with ammonia, the secondary condensation product from one molecular proportion of cyanuric chloride, one molecular proportion of 1-amino-4-acetylamino-3-benzene sulfonic acid, and one molecular proportion of ammonia is formed. This product is also a grey powder, soluble in water without coloration. It contains still one mobile atom of chlorine and one acetylamino group. The replacement of ammonia by aniline leads to a product with analogous properties but a little less soluble.

Instead of ammonia or aniline one may also substitute more complicated components. If for instance a solution formed by 15.3 parts of p-aminosalicylic acid, 13.3 parts of caustic soda solution of 30 per cent strength, 30 parts of crystallized sodium acetate, and 150 parts of water is added to the crude solution of the primary condensation product, the secondary condensation product from 1 molecular proportion of cyanuric chloride, one molecular proportion of p-aminosalicylic acid, and one molecular proportion of 1-amino-4-acetylamino-3-benzene sulfonic acid is formed, which is characterized by the presence of one mobile chlorine atom, one acetylamino group, and one external salicylic acid group. It corresponds very probably with the formula:

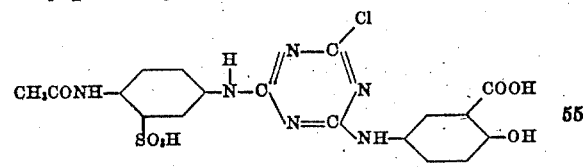

Example 2.

As the three atoms of halogen of the cyanuric halides react with different rapidity, the cyanuric halide may be added simply to a solution or a mixture of the components of the two phases of the herein described process, whereby the two stages of the reaction can be exactly followed.

If for instance 30.2 parts of 1-amino-4-acetylamino-naphthalene-6-sulfonate of sodium in 500 parts of water are stirred with 9.3 parts of cyanuric chloride in a fine state of subdivision, the mixture being always kept neutral by adding carefully some sodium carbonate, the primary condensation product is formed first, which precipitates and dissolves again while condensing with a second molecular proportion of acetyl-naphthylenediamine sulfonic acid.

The secondary condensation product thus obtained from 1 molecular proportion of cyanuric chloride and two molecular proportions of 1-amino-4-acetylaminonaphthalene-6-sulfonic acid forms a grey powder which is characterized by the presence of 2-acetylamino groups and 1 mobile atom of chlorine.

By operating in a similar manner there may be obtained secondary condensation products from one molecular proportion of cyanuric chloride and two molecular proportions of p-phenylenediamine-3-sulfonic acid (grey powder easily soluble in alkalies), or from one molecular proportion of cyanuric chloride and two molecular proportions of 1-(3'-amino)-phenyl-5-pyrazolone-3-carboxylic acid (a brownish powder, insoluble in acids, easily soluble in alkalies). The new product corresponds very probably with the formula

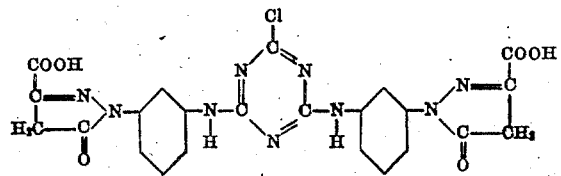

Example 3.

If in the herein described process such a compound is chosen as component of the second phase, which contains at two different positions of its molecule mobile atoms of hydrogen, such as for instance, a diamine, there is thus formed a condensation product of the second phase which contains two cyanuric residues.

A condensation product of this kind is for instance obtained by treating 37.6 parts of 1:3-phenylenediamine-4-sulfonic acid dissolved in 1000 parts of water by means of 10.6 parts of sodium carbonate with 37 parts of cyanuric chloride. The mixture is stirred until the components have disappeared, neutralized with soda, and the solution of the primary condensation product thus obtained is treated with 10.8 parts of phenylenediamine and stirred during several hours at 40–50° C.

The di-secondary product thus obtained has the formula:

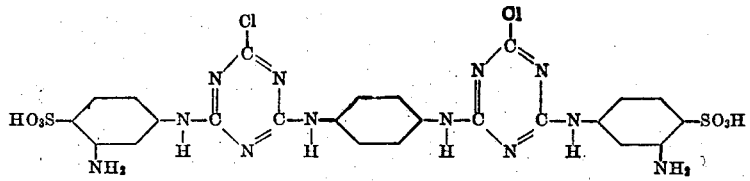

The product is precipitated out of its solution by means of acid and is characterized by the presence of two amino-groups and two mobile atoms of chlorine.

*Example 4.*

An iced aqueous suspension of 18.5 parts of cyanuric chloride is treated with an aqueous solution of 21 parts of 1:3-phenylenediamine-4-sulfonate of sodium. The acid disappears rapidly under formation of the corresponding primary condensation product. After neutralizing with sodium carbonate, a solution of 26.1 parts of 2:5-aminonaphthol-7-sulfonate of sodium in 200 parts of water is added, while stirring, at about 20° C., until the aminonaphtholsulfonic acid has almost completely disappeared. The isolated product contains a free diazotizable amino-group.

*Example 5.*

31.9 parts of 1:8-aminonaphthol-3:6-disulfonic acid are dissolved by means of 13.3 parts of caustic soda solution of 30 per cent strength, treated with 18.5 parts of cyanuric chloride, and stirred until the latter has disappeared.

If this solution is carefully neutralized by means of cold dilute soda solution, and stirred after being treated once more with 13.3 parts of caustic soda solution of 30 per cent strength until the liquid is again neutral, there is obtained the secondary condensation product from one molecular proportion of cyanuric chloride, one molecular proportion of 1:8-aminonaphthol-3:6-disulfonic acid, and one molecular proportion of water. The product is precipitated by means of common salt and acid and forms a light colored precipitate which is more easily soluble than the starting material. Its alkaline solutions do not fluoresce, and it is characterized by the presence of one mobile atom of chlorine.

By treatment of the primary condensation product with ammonia, diethylamine or acetamide in the cold or at ordinary temperature, there is formed in an analogous manner the secondary condensation product from one molecular proportion of cyanuric chloride, one molecular proportion of 1:8-aminonaphthol-3:6-disulfonic acid and one molecular proportion of ammonia or diethylamine or acetamide. All these products are also characterized by their great solubility, by their alkaline solutions which do not fluoresce, and by the presence of one mobile atom of chlorine. The new product corresponds very probably with the general formula:

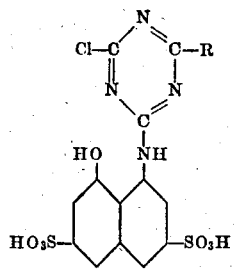

in which —R means —OH, or —NH$_2$, or

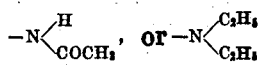

*Example 6.*

If a freshly prepared solution of the condensation product from one molecular proportion of cyanuric chloride and one molecular proportion of 1:8-aminonaphthol-3:6-disulfonic acid is treated first with 30 parts of crystallized sodium acetate and then with a solution of 12.9 parts of aniline hydrochloride, the aniline disappears completely while stirring and a secondary condensation product from one molecular proportion of cyanuric chloride, one molecular proportion of 1:8-aminonaphthol-3:6-disulfonic acid, and one molecular proportion of aniline is formed. This new secondary condensation product is precipitated by means of common salt and forms, when dry, a grey powder easily soluble in alkalies without fluorescence.

With other primary or secondary amines instead of aniline there are obtained the corresponding secondary condensation products. Among such products there may be named those obtained by means of the following amino-derivatives: p-aminoacetanilide, m-aminoformanilide, m-aminobenzoic acid, o- and p-aminosalicylic acid, 4-chloro-6-aminosalicylic acid, 4-sulfo-6-aminosalicylic acid, aminophthalic acid, and the like. All these secondary condensation products form grey powders; their alkaline solutions do not fluoresce, and they contain still one mobile atom of chlorine.

Example 7.

18.5 parts of cyanuric chloride are suspended in about 1000 parts of water and treated by and by, while stirring, at 0° C. with 26.2 parts of 2:5-aminonaphthol-7-sulfonic acid, keeping the mixture always slightly acid by addition of a solution of sodium carbonate. As soon as the whole is dissolved and no more aminonaphthol can be traced, the liquid is treated with a solution of 17.4 parts of m-nitraniline in 300 parts of water and gently warmed. The secondary condensation product from one molecular proportion of cyanuric chloride, one molecular proportion of 2:5-aminonaphthol-7-sulfonic acid, and one molecular proportion of m-nitraniline forms a yellowish powder, which is soluble in alkalies with slightly yellow coloration without fluorescence.

In an analogous manner there are obtained other secondary condensation products from 1 molecular proportion of cyanuric chloride, one molecular proportion of 2:5-aminonaphthol-7-sulfonic acid, and one molecular proportion of m-nitraniline, or one molecular proportion of another aromatic compound, such as for instance, aniline and its homologues, p- and m-phenylenediamine, m-aminoformanilide. All these products form grey powders which dissolve in alkalies without fluorescence, and those containing free amino-groups are capable of yielding diazo-compounds with nitrite and mineral acids.

Example 8.

18.5 parts of cyanuric chloride are suspended in 20 times their weight of water and treated in the cold with 26.1 parts of 2:8-aminonaphthol-6-sulfonate of sodium. After half an hour the free hydrochloric acid (3.6 parts) is neutralized with the corresponding quantity of sodium carbonate, the whole is then treated with 11.6 parts of sodium phenolate and stirred until the liquid becomes neutral. The secondary condensation product from one molecular proportion of cyanuric chloride, one molecular proportion of 2:8-aminonaphthol-6-sulfonic acid, and one molecular proportion of phenol thus obtained is precipitated with hydrochloric acid. It forms a grey powder, soluble without fluorescence in alkalies and characterized by the presence of one mobile atom of chlorine and corresponds very probably with the formula:

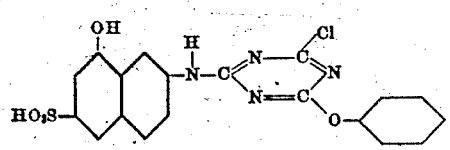

Example 9.

31.9 parts of 1:8-aminonaphthol-3:6-disulfonic acid are dissolved by means of 13.3 parts of caustic soda solution of 30% strength, treated with 18.5 parts of cyanuric chloride and stirred until all the components have disappeared. The solution thus obtained of the primary condensation product is neutralized very carefully and almost exactly, and treated with a solution of 31 parts of 1:8-aminonaphthol-3:6-disulfonic acid, 13.3 parts of caustic soda solution of 30 per cent strength, 30 parts of sodium acetate and 150 parts of water. After stirring for half an hour to one hour, the 1:8-aminonaphthol-3:6-disulfonic acid has disappeared and the secondary condensation product from one molecular proportion of cyanuric chloride and two molecular proportions of 1:8-aminonaphthol-3:6-disulfonic acid has precipitated partly. The precipitation is completed by the addition of common salt. The new condensation product, when dried, forms a grey powder dissolving in alkalies without fluorescence. It contains still one mobile atom of chlorine.

The corresponding secondary condensation product from one molecular proportion of cyanuric chloride and two molecular proportions of 2:5-aminonaphthol-7-sulfonic acid may be obtained in the following manner:

The solution of the primary condensation product from 18.5 parts of cyanuric chloride and 26.2 parts of the sodium salt of 2:5-aminonaphthol-7-sulfonic acid is neutralized in the cold with carbonate of sodium and there is added a fresh solution of 26.2 parts of sodium 2:5-aminonaphthol-7-sulfonate. This mixture is stirred until the aminonaphthol has almost completely disappeared. By adding mineral acid and common salt there may be isolated from the solution thus obtained the secondary condensation product from two molecular proportions of 2:5-aminonaphthol-7-sulfonic acid and one molecular proportion of cyanuric chloride in the form of a grey powder.

The new product shows the following particularities: When its aqueous solution which does not fluoresce, is heated in the presence of sodium carbonate, it loses a part of its coupling capacity. Apart from this special reaction it behaves like the other secondary condensation products. Symmetrical secondary condensation products may be obtained in the same manner with other aminonaphthols, such as for instance, the 1:8-aminonaphthol-4-sulfonic acid and the 2:8-aminonaphthol-6-sulfonic acid.

Equally easily, mixed derivatives may be prepared by using in the two phases of the preparation of the secondary condensation product two different aminonaphthols; for instance the secondary condensation product from one molecular proportion of cyanuric chloride, one molecular proportion of 1:8-aminonaphthol-3:6-disulfonic acid, and one molecular proportion of 2:5-aminonaphthol-7-sulfonic acid can be obtained by treating the solutions of the primary condensation product from one molecular proportion of cyanuric chloride and one molecular proportion of 1:8-aminonaphthol-3:6-disulfonate of sodium with the aqueous solution of one molecular proportion of 2:5-aminonaphthol-7-sulfonate of sodium or, on the contrary, by treating the primary condensation product from one molecular proportion of cyanuric chloride and one molecular proportion of 2:5-aminonaphthol-7-sulfonic acid with one molecular proportion of 1:8-aminonaphthol-3:6-disulfonate of sodium. The two processes yield the same condensation product which forms a grey powder.

It corresponds very probably with the formula:

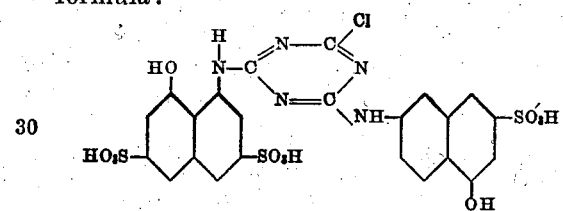

Example 10.

To a solution of the primary condensation product from one molecular proportion of 1:8-aminonaphthol-3:6-disulfonic acid and one molecular proportion of cyanuric chloride there is added a solution made from 35.8 parts of 2(3'-aminobenzoyl)-amino-5-naphthol-7-sulfonic acid, 13.3 parts of caustic soda solution of 30 per cent strength, 200 parts of water and 13.6 parts of crystallized sodium acetate. The mixture is stirred until nearly all the last named sulfonic acid has disappeared. The solution then contains the secondary condensation product which may be isolated by adding common salt. It is a grey powder which is soluble in alkalies to a solution which does not fluoresce, and which contains a mobile atom of chlorine.

It is also possible to combine together by means of cyanuric chloride aminonaphthols which are more complicated.

108.6 parts of the reduced N-condensation product from nitrobenzoylchloride and 1-(3'-aminobenzoyl)-amino-8-naphthol-3:6-disulfonic acid are dissolved in water by means of 26.6 parts of caustic soda solution of 30 per cent strength, and then treated, first in the cold, and afterwards by slight heating, with 18.5 parts of cyanuric chloride in a fine state of subdivision. The secondary condensation product thus obtained is precipitated by means of hydrochloric acid, filtered and dried. It is a grey powder, soluble in alkalies to a solution which is not fluorescent. The new product corresponds very probably with the formula

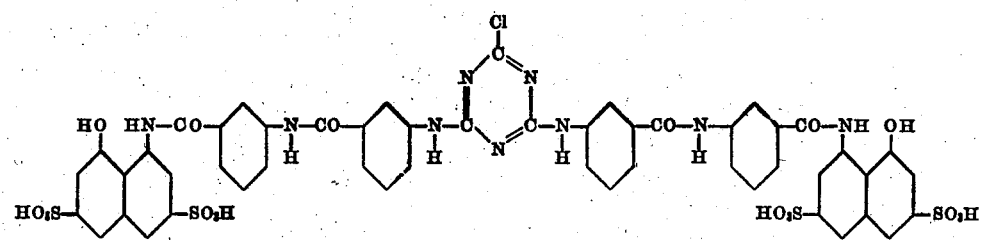

Example 11.

The solution of the primary condensation product from one molecular proportion of cyanuric chloride and one molecular proportion of 2:5-aminonaphthol-7-sulfonic acid is treated with an aqueous solution of 5.04 parts (one half molecular proportion) of p-phenylenediamine. By neutralizing the formed hydrochloric acid and gently warming, the condensation is achieved. From this solution there can be separated, by adding common salt, the substances having properties corresponding with the formula:

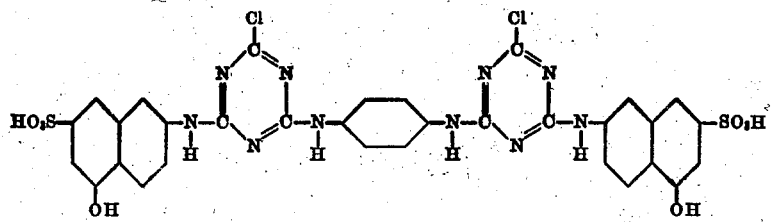

The new product is a grey powder yielding with alkalies a solution which does not fluoresce.

What we claim is:
1. The herein described process of producing new intermediate products for the synthesis of azo-dyes, which consists in condensing, in a first phase, one molecular proportion of a cyanuric trihalide with one molecular proportion of a compound of the aromatic series having, firstly, a non-tertiary amino group, secondly, still containing at least one of a group of auxochromes including

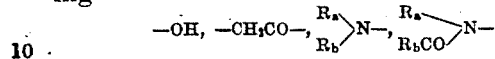

(wherein $R_a$ and $R_b$ represent the same or different alkyl, aryl or aralkyl radicals or a hydrogen atom), and thirdly, containing at least one strong acid group, then condensing, in a second phase, at least one molecular proportion of the products thus obtained with one molecular proportion of one of a group of compounds which contains at least one amino or one hydroxyl group, at least one of the two phases being carried out in water.

2. The herein described process of producing new intermediate products for the synthesis of azo-dyes, which consists in condensing, in a first phase, one molecular proportion of a cyanuric trihalide with one molecular proportion of a compound of the aromatic series derived from a hydrocarbon which contains not more than 10 carbon atoms and having, firstly, a non-tertiary amino group, secondly, still containing at least one of a group of auxochromes including

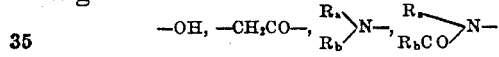

(wherein $R_a$ and $R_b$ represent the same or different alkyl, aryl or aralkyl radicals or a hydrogen atom), and thirdly, containing at least one strong acid group, then condensing, in a second phase, at least one molecular proportion of the products thus obtained with one molecular proportion of one of a group of compounds which contains at least one amino or one hydroxyl group, at least one of the two phases being carried out in water.

3. The herein described process of producing new intermediate products for the synthesis of azo-dyes, which consists in condensing, in a first phase, one molecular proportion of cyanuric trihalide with one molecular proportion of a primary aromatic amine derived from a hydrocarbon which contains not more than 10 carbon atoms and having still at least one of a group of auxochromes including

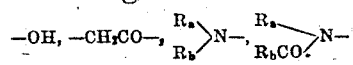

(wherein $R_a$ and $R_b$ represent the same or different alkyl, aryl or aralkyl radicals or a hydrogen atom), and which contains at least one strong acid group, then condensing, in a second phase, at least one molecular proportion of the products thus obtained with one molecular proportion of one of a group of compounds which contains at least one amino or one hydroxyl group, at least one of the two phases being carried out in water.

4. The herein described process of producing new intermediate products for the synthesis of azo-dyes, which consists in condensing, in a first phase, one molecular proportion of a cyanuric trihalide with one molecular proportion of a primary aromatic amine derived from a hydrocarbon which contains not more than 10 carbon atoms and having still at least one of a group of auxochromes including

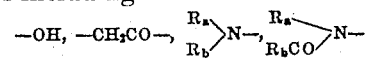

(wherein $R_a$ and $R_b$ represent the same or different alkyl, aryl or aralkyl radicals or a hydrogen atom), and which contains at least one sulfo group, then condensing, in a second phase, at least one molecular proportion of the products thus obtained with one molecular proportion of one of a group of compounds which contains at least one amino or one hydroxyl group, at least one of the two phases being carried out in water.

5. The herein described process of producing new intermediate products for the synthesis of azo-dyes, which consists in condensing, in a first phase, one molecular proportion of a cyanuric trihalide with one molecular proportion of a primary aromatic amine derived from a hydrocarbon which contains not more than 10 carbon atoms and having still at least one of a group of auxochromes including

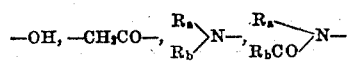

(wherein $R_a$ and $R_b$ represent the same or different alkyl, aryl or aralkyl radicals or a hydrogen atom), and which contains at least one sulfo group, then condensing, in a second phase, at least one molecular proportion of the products thus obtained with one molecular proportion of an aromatic amino compound which carries hydrogen atoms capable of being exchanged in amino groups, at least one of the two phases being carried out in water.

6. The herein described process of producing new intermediate products for the synthesis of azo-dyes, which consists in condensing, in a first phase, one molecular proportion of a cyanuric trihalide with one molecular proportion of a primary aromatic amine derived from a hydrocarbon which contains not more than 10 carbon atoms and having still at least one of a group of auxochromes including

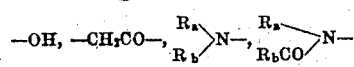

(wherein $R_a$ and $R_b$ represent the same or different alkyl, aryl or aralkyl radicals or a hydrogen atom), and which contains at least one sulfo group, then condensing, in a second phase, one molecular proportion of the products thus obtained with one molecular proportion of an aromatic amino compound which contains at least one primary amino group, at least one of the two phases being carried out in water.

7. The herein described new intermediate products for the synthesis of azo-dyes of the general formula:

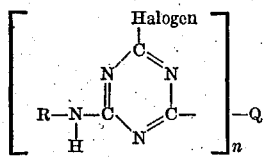

wherein R means an aromatic residue which, firstly, contains at least one strong acid group, secondly, contains at least one of a group of auxochromes including

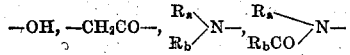

(wherein $R_a$ and $R_b$ represent the same or different alkyl, aryl or aralkyl radicals or a hydrogen atom), Q a hydrogen atom or a radical which are linked to the carbon atom of the cyanuric nucleus by one of a group of connecting links which contains O or N, and $n$ a whole number not higher than the number of the mobile hydrogen atoms originally present in the amino and hydroxy groups of the compounds corresponding with the radical Q, which products form colorless to gray and yellowish powders which dissolve in solvents forming from colorless to yellow and brownish to yellow and brownish solutions, and which are characterized by the presence of a mobile atom of halogen at the cyanuric nucleus.

8. The herein described new intermediate products for the synthesis of azo-dyes of the general formula:

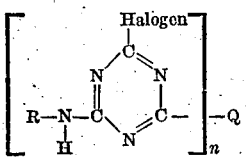

wherein R means an aromatic residue derived from a hydrocarbon which contains not more than 10 carbon atoms and which, firstly, contains at least one strong acid group, secondly, contains at least one of a group of auxochromes including

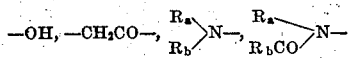

(wherein $R_a$ and $R_b$ represent the same or different alkyl, aryl or aralkyl radicals or a hydrogen atom), Q a hydrogen atom or a radical which are linked to the carbon atom of the cyanuric nucleus by one of a group of connecting links which contains O or N, and $n$ a whole number not higher than the number of the mobile hydrogen atoms originally present in the amino and hydroxy groups of the compounds corresponding with the radical Q, which products are from colorless to gray and yellowish powders which dissolve in solvents forming from colorless to yellow and brownish solutions, and which are characterized by the presence of a mobile atom of halogen at the cyanuric nucleus.

9. The herein described new intermediate products for the synthesis of azo-dyes of the general formula:

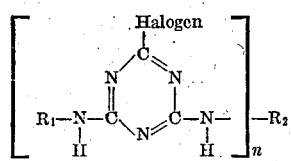

wherein $R_1$ means an aromatic residue which, firstly, contains at least one sulfo group, secondly, contains at least one of a group of auxochromes including

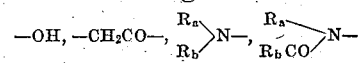

(wherein $R_a$ and $R_b$ represent the same or different alkyl, aryl or aralkyl radicals or a hydrogen atom), $R_2$ being an aromatic residue, and $n$ a whole number not higher than the number of the mobile hydrogen atoms originally present in the molecule of the radical $R_2$.

10. The herein described new intermediate products for the synthesis of azo-dyes of the general formula:

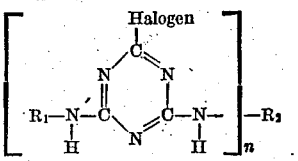

wherein $R_1$ means an aromatic residue derived from a hydrocarbon which contains not more than 10 carbon atoms and which, firstly, contains at least one sulfo group, secondly, contains at least one of a group of auxochromes including

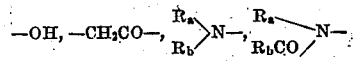

(wherein $R_a$ and $R_b$ represent the same or different alkyl, aryl or aralkyl radicals or a hydrogen atom), $R_2$ being a radical of an aromatic compound, and $n$ a whole number smaller than three, which products are from colorless to gray and yellowish powders which dissolve in solvents forming from colorless to yellow and brownish solutions, and which are characterized by the presence of a mobile atom of halogen at the cyanuric nucleus.

11. The herein described new intermediate products for the synthesis of azo-dyes of the general formula:

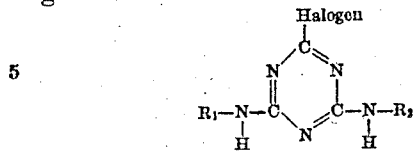

wherein $R_1$ means an aromatic residue derived from a hydrocarbon which contains not more than 10 carbon atoms and which, firstly, contains at least one sulfo group, secondly, contains at least one of a group of auxochromes including

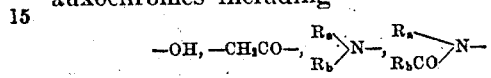

(wherein $R_a$ and $R_b$ represent the same or different alkyl, aryl or aralkyl radicals or a hydrogen atom), $R_2$ being an aromatic residue, which products are from colorless to gray and yellowish powders which dissolve in solvents forming from colorless to yellow and brownish solutions, and which are characterized by the presence of a mobile atom of halogen at the cyanuric nucleus.

12. The herein described new intermediate products for the synthesis of azo-dyes of the general formula:

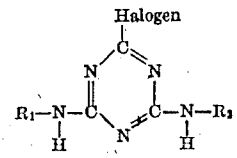

wherein $R_1$ means an aromatic residue derived from a hydrocarbon which contains not more than 10 carbon atoms and which, firstly, contains at least one sulfo group, secondly, contains at least one of a group of auxochromes including OH and $NH_2$, $R_2$ being a radical of an aromatic amino compound, which products are from colorless to gray and yellowish powders which dissolve in solvents forming from colorless to yellow and brownish solutions, and which are characterized by the presence of a mobile atom of halogen at the cyanuric nucleus.

In witness whereof we have hereunto signed our names this 6th day of July, 1923.

HERMANN FRITZSCHE.
EDUARD KRUMMENACHER.
HANS GUBLER.
OTTO KAISER.